United States Patent
Ives et al.

(10) Patent No.: US 8,948,535 B2
(45) Date of Patent: Feb. 3, 2015

(54) CONTEXTUALIZING NOISY SAMPLES BY SUBSTANTIALLY MINIMIZING NOISE INDUCED VARIANCE

(75) Inventors: Paul M. Ives, Toronto (CA); Chin Hsu, Toronto (CA)

(73) Assignee: DST Technologies, Inc., Kansas City, MO (US)

( * ) Notice: Subject to any disclaimer, the term of this patent is extended or adjusted under 35 U.S.C. 154(b) by 967 days.

(21) Appl. No.: 12/874,573

(22) Filed: Sep. 2, 2010

(65) Prior Publication Data

US 2011/0182527 A1 Jul. 28, 2011

Related U.S. Application Data

(63) Continuation-in-part of application No. 12/695,009, filed on Jan. 27, 2010, and a continuation-in-part of application No. 12/859,328, filed on Aug. 19, 2010, now Pat. No. 8,600,173.

(51) Int. Cl.
G06K 9/00 (2006.01)

(52) U.S. Cl.
CPC ........ G06K 9/00483 (2013.01); G06K 9/00442 (2013.01)
USPC ............................ 382/264; 382/260; 382/275

(58) Field of Classification Search
None
See application file for complete search history.

(56) References Cited

U.S. PATENT DOCUMENTS

| | | | |
|---|---|---|---|
| 4,992,649 A | 2/1991 | Mampe et al. | |
| 5,181,255 A | 1/1993 | Bloomberg | |
| 5,191,525 A | 3/1993 | LeBrun et al. | |
| 5,258,855 A | 11/1993 | Lech et al. | |
| 5,369,508 A | 11/1994 | Lech et al. | |
| 5,552,901 A | 9/1996 | Kikuchi et al. | |
| 5,587,809 A | 12/1996 | Le Corre et al. | |
| 5,625,465 A | 4/1997 | Lech et al. | |
| 5,631,984 A | 5/1997 | Graf et al. | |
| 5,768,416 A | 6/1998 | Lech et al. | |
| 5,787,209 A | * 7/1998 | Konstantinides et al. | .... 382/260 |
| 6,094,505 A | 7/2000 | Lech et al. | |
| 6,397,261 B1 | 5/2002 | Eldridge et al. | |
| 6,510,992 B2 | 1/2003 | Wells et al. | |

(Continued)

OTHER PUBLICATIONS

Li et al. "Skew detection using wavelet decomposition and projection profile analysis", Pattern Recognition Letters 28 (2007) 555-562.*

(Continued)

*Primary Examiner* — Wesley Tucker
(74) *Attorney, Agent, or Firm* — Lempia Summerfield Katz LLC

(57) ABSTRACT

A system for contextualizing noisy samples by substantially minimizing noise induced variance may include a memory, an interface, and a processor. The memory is operative to store exemplars. The processor is operative to receive, via the interface, a sample which includes exemplar content corresponding to one of the exemplars, and noise. Variance induced by the noise may differentiate the sample from one or more of the exemplars. The processor may generalize the sample and the exemplars in order to substantially minimize the variance. The processor may compare the generalized sample to the generalized exemplars to identify the exemplar corresponding to the exemplar content of the sample. The processor may contextualize the sample based on a document type of the identified exemplar. The processor may present the contextualized sample to a user to facilitate interpretation thereof, and in response thereto, receive data representative of a user determination associated with the noise.

26 Claims, 11 Drawing Sheets

(56) References Cited

U.S. PATENT DOCUMENTS

| | | | |
|---|---|---|---|
| 6,529,956 B1 | 3/2003 | Smith et al. | |
| 6,610,955 B2 | 8/2003 | Lopez | |
| 6,683,697 B1 | 1/2004 | Lech et al. | |
| 6,697,703 B2 | 2/2004 | Lopez | |
| 6,819,777 B2 | 11/2004 | Baker et al. | |
| 6,909,805 B2 | 6/2005 | Ma et al. | |
| 6,940,617 B2 | 9/2005 | Ma et al. | |
| 7,072,514 B1 | 7/2006 | Thouin | |
| 7,075,673 B2 | 7/2006 | Lech et al. | |
| 7,162,635 B2 | 1/2007 | Bisbee et al. | |
| 7,184,162 B2 | 2/2007 | Lech et al. | |
| 7,259,887 B2 | 8/2007 | Lech et al. | |
| 7,283,270 B2 | 10/2007 | Boire-Lavigne et al. | |
| 7,474,434 B2 | 1/2009 | Lech et al. | |
| 7,570,383 B2 | 8/2009 | Lech et al. | |
| 7,603,618 B2 * | 10/2009 | Mori et al. | 715/229 |
| 7,619,768 B2 | 11/2009 | Lech et al. | |
| 7,672,007 B2 | 3/2010 | Lech et al. | |
| 8,219,817 B2 * | 7/2012 | Filreis et al. | 713/176 |
| 2003/0145212 A1 | 7/2003 | Crumly | |
| 2004/0158733 A1 | 8/2004 | Bouchard | |
| 2004/0240735 A1 | 12/2004 | Medina | |
| 2005/0192924 A1 | 9/2005 | Drucker et al. | |
| 2006/0132608 A1 * | 6/2006 | BenDaniel et al. | 348/207.1 |
| 2006/0238822 A1 | 10/2006 | Van Hoof | |
| 2008/0002224 A1 | 1/2008 | Tanimoto | |
| 2008/0019519 A1 | 1/2008 | Su et al. | |
| 2008/0133940 A1 | 6/2008 | Laurie et al. | |
| 2008/0144121 A1 | 6/2008 | Malatesta | |
| 2008/0256061 A1 | 10/2008 | Chang et al. | |
| 2009/0034782 A1 * | 2/2009 | Gering | 382/100 |
| 2010/0067067 A1 | 3/2010 | Lech et al. | |

OTHER PUBLICATIONS

Nielson, Heath and Barrett, William, "Automatic Zoning of Digitized Documents," available at: http://fht.byu.edu/prev_workshops/workshop01/final/Nielson.pdf, last visited Aug. 25, 2010, 2 pages.

Ye, Xiangyun, Cheriet, Mohamed, and Suen Ching, "A Generic System to Extract and Clean Handwritten Data from Business Forms," Proceedings of the Seventh International Workshop on Frontiers in Handwriting Recognition, Sep. 11-13, 2000, pp. 63-72.

"Hausdorff Distance Image Comparison," available at http://www.cs.cornell.edu/Vision/hausdorff/hausdist.html, copyright 2000, 2 pages [retrieved on Jul. 2, 2009].

Andreev, Andrey and Kirov, Nikolay, "Some Variants of Hausdorff Distance for Word Matching," Institute of Mathematics and Informatics, Bulgarian Academy of Sciences, 2008, pp. 3-8.

Evans, Christopher, "Notes on the OpenSURF Library," Jan. 18, 2009, 25 pages.

"Optical Mark Recognition," Wikipedia, the free encyclopedia, available at: http://en.wikipedia.org/wiki/Optical_mark_recognition, last modified on Oct. 16, 2009, pp. 1-6 [retrieved on Oct. 21, 2009].

Kesavamurthy et al., "Pattern Classification using imaging techniques for Infarct and Hemorrhage Identification in the Human Brain," Calicut Medical Journal 2006; 4(3):e1, 5 pages.

Klein, "A2iA, Recognizing the Worlds's Handwriting", Mar. 26, 2009, pp. 1-13.

Beretta et al., "Perceptually lossy compression of documents", HPL-97-23, Jan. 1997, 13 pgs.

* cited by examiner

CONTEXTUALIZING NOISY SAMPLES BY SUBSTANTIALLY MINIMIZING NOISE INDUCED VARIANCE

CROSS-REFERENCE TO RELATED APPLICATIONS

This application is a continuation-in-part of U.S. patent application Ser. No. 12/695,009, filed on Jan. 27, 2010 and a continuation-in-part of U.S. patent application Ser. No. 12/859,328, filed on Aug. 19, 2010 now U.S. Pat. No. 8,600,173, both of which are incorporated by reference herein.

TECHNICAL FIELD

The present description relates generally to a system and method, generally referred to as a system, for contextualizing noisy samples by substantially minimizing noise induced variance, and more particularly, but not exclusively, to contextualizing a noisy sample having content corresponding to a known exemplar by substantially minimizing the noise induced variance between the sample and the known exemplar such that the known exemplar can be identified from the content of the sample.

BACKGROUND

Document receiving organizations may receive vast quantities of printed forms from users, such as magazine subscription forms, change of address forms, or generally any forms which may be used to provide information. A received form may include the underlying typographic information of the form and information added to the form by a user. The document receiving organization may generate electronic images of the received forms to facilitate processing the forms. Since the document receiving organization may receive many different types of forms, each of which may be processed differently, the processing of the forms may be expedited if the type of each form can be automatically identified, such as by comparing the electronic image of each form to electronic images of blank forms, or form templates. However, while the received forms may include all or part of a blank form, the received forms may also include one or more variations to the blank form, such as information added to forms by users, facsimile markings, coffee stains, ink smudges, etc. The variations may result in noise which renders image comparison techniques based on pixel and location checking ineffective, thereby requiring the receiving organization to manually identify and/or classify each received form.

Likewise, the growth of user generated content on the Internet may be increasing the occurrence of unauthorized posting of copyrighted content. For example, user generated content, such as "mash-ups", may often include all or part of copyrighted content, such as songs, images, or video. The unauthorized posting of copyrighted content may be creating a challenging situation for web sites hosting vast quantities of user generated content, such as YouTube™. For example, certain jurisdictions may require that the hosting web sites remove any unauthorized copyrighted content once notified that the copyrighted content has been posted on their site. Thus the hosting sites may be required to monitor user generated content to determine whether the user generated content includes copyrighted content. For example, copyright owners may provide exemplar images, video, or audio files, and the hosting sites may be required to search user generated content for images, video, or audio files which may be similar to the files provided by the copyright holders. However, while the user generated content may include all or part of copyrighted content, the user generated content may also include one or more variations to the copyrighted content. The one or more variations of the user generated content may result in noise which renders direct content comparison techniques, or sampling techniques, ineffective in identifying the copyrighted content. Further variations in the user generated content, such as variations in resolution, sampling rate, or noise, may also prevent the hosting sites from correctly identifying copyrighted content.

SUMMARY

A system for contextualizing noisy samples by substantially minimizing noise induced variance may include a memory, an interface, and a processor. The memory may be operative to store exemplars. The interface is coupled with the memory and is operative to receive a sample which includes exemplar content, corresponding to one of the exemplars, and noise. However, variance induced by the noise may differentiate the sample from one or more of the exemplars. The processor is coupled with the memory and the interface and is operative to receive, via the interface, the sample. The processor may generalize the sample and the exemplars in order to substantially minimize the variance induced by the noise of the sample. The processor may compare the generalized sample to each of the generalized exemplars to identify the exemplar corresponding to the exemplar content of the sample. The processor may contextualize the sample based on a document type of the identified exemplar. The processor may present the contextualized sample to a user to facilitate interpretation thereof, and in response thereto, receive data representative of a user determination associated with the noise. Alternatively or in addition, contextualized samples, or any sample for which a document type is known, may be used as exemplars.

Other systems, methods, features and advantages will be, or will become, apparent to one with skill in the art upon examination of the following figures and detailed description. It is intended that all such additional systems, methods, features and advantages be included within this description, be within the scope of the embodiments, and be protected by the following claims and be defined by the following claims. Further aspects and advantages are discussed below in conjunction with the description.

BRIEF DESCRIPTION OF THE DRAWINGS

The system and/or method may be better understood with reference to the following drawings and description. Non-limiting and non-exhaustive descriptions are described with reference to the following drawings. The components in the figures are not necessarily to scale, emphasis instead being placed upon illustrating principles. In the figures, like referenced numerals may refer to like parts throughout the different figures unless otherwise specified.

1, or other systems for contextualizing noisy samples by substantially minimizing noise induced variance.

Figure 1:
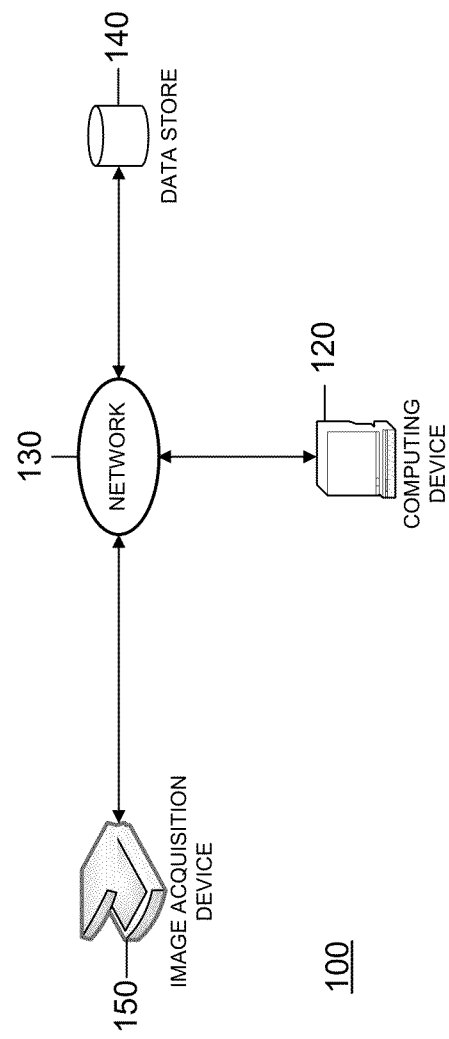
FIG. 1 is a block diagram of a general overview of a system for contextualizing noisy samples by substantially minimizing noise induced variance.
Figure 4:
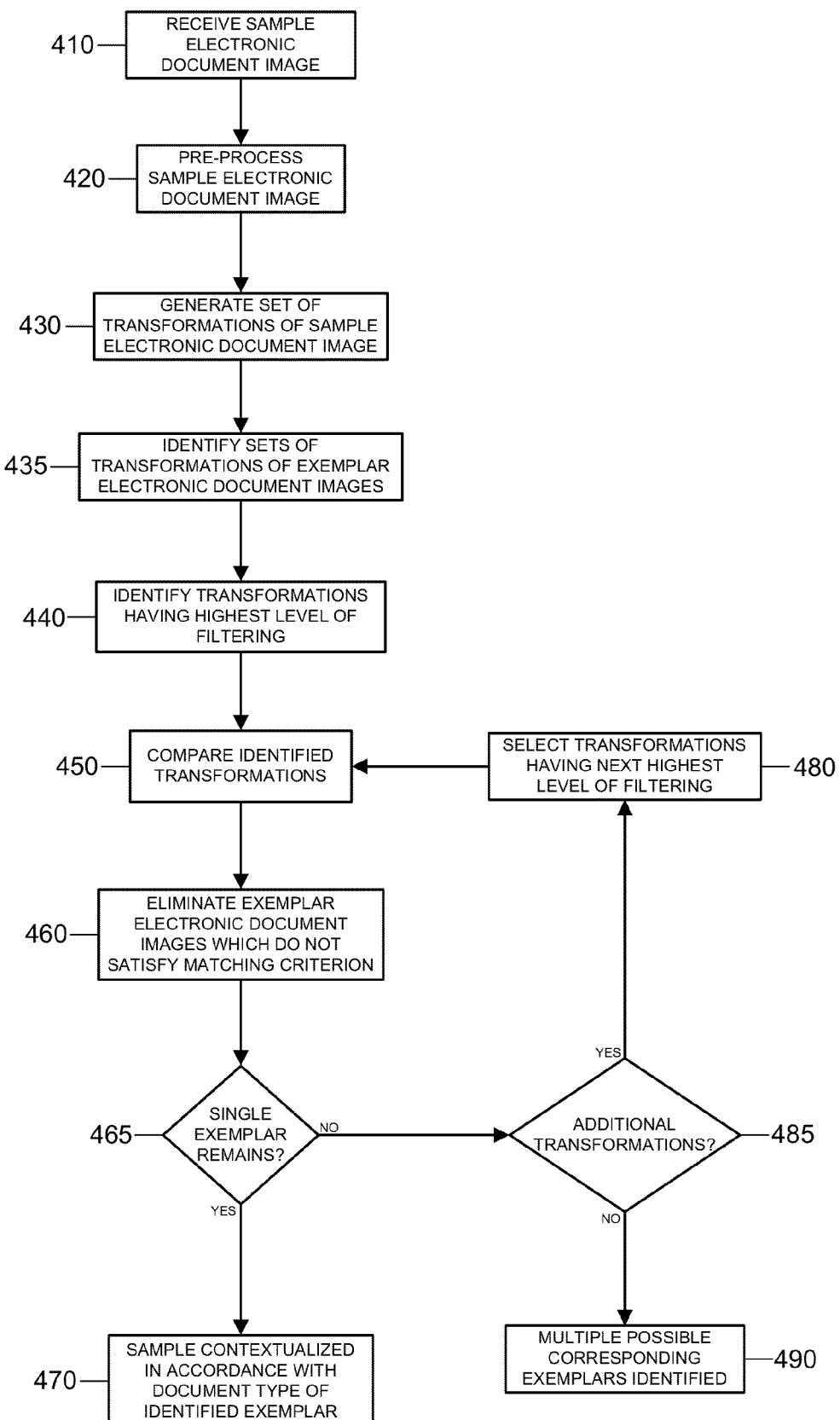

FIG. 4 is a flowchart illustrating the operations of identifying noisy electronic document images using transformations of the electronic document image having varying levels of filtering in the system of FIG. 1, or other systems for contextualizing noisy samples by substantially minimizing noise induced variance.

Figure 5:
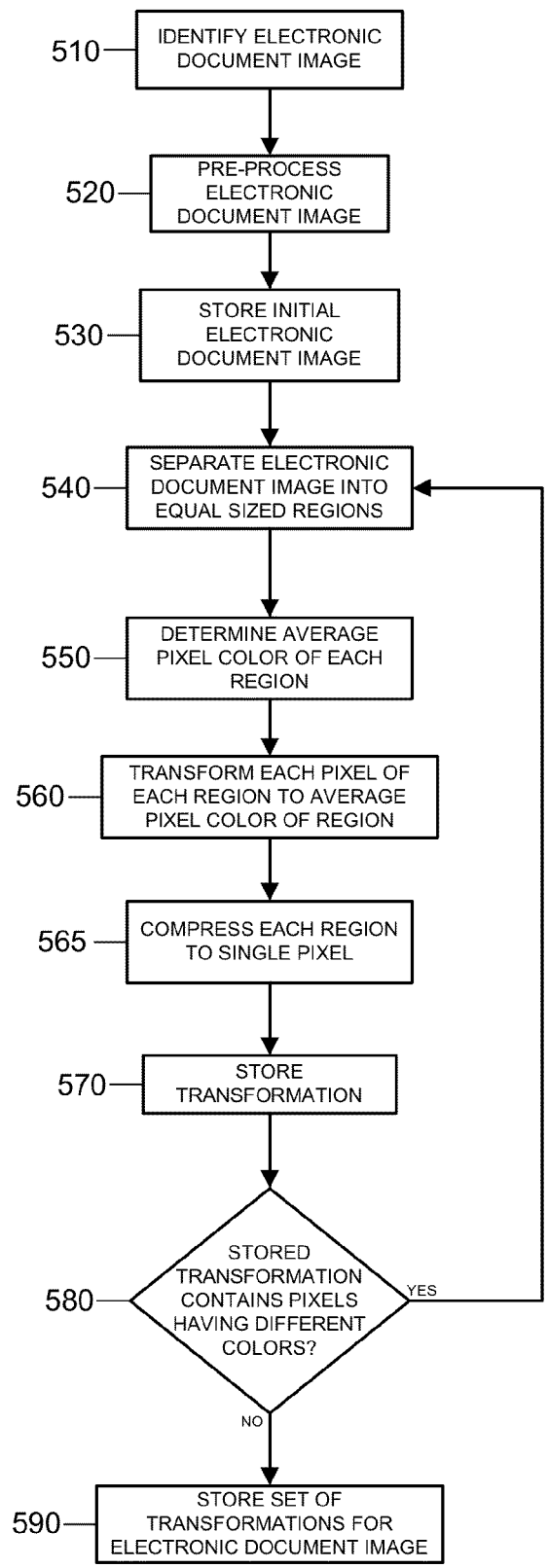

FIG. 5 is a flowchart illustrating the operations of generating transformations of an electronic document image having varying levels of filtering in the system of FIG. 1, or other systems for contextualizing noisy samples by substantially minimizing noise induced variance.

Figure 6:
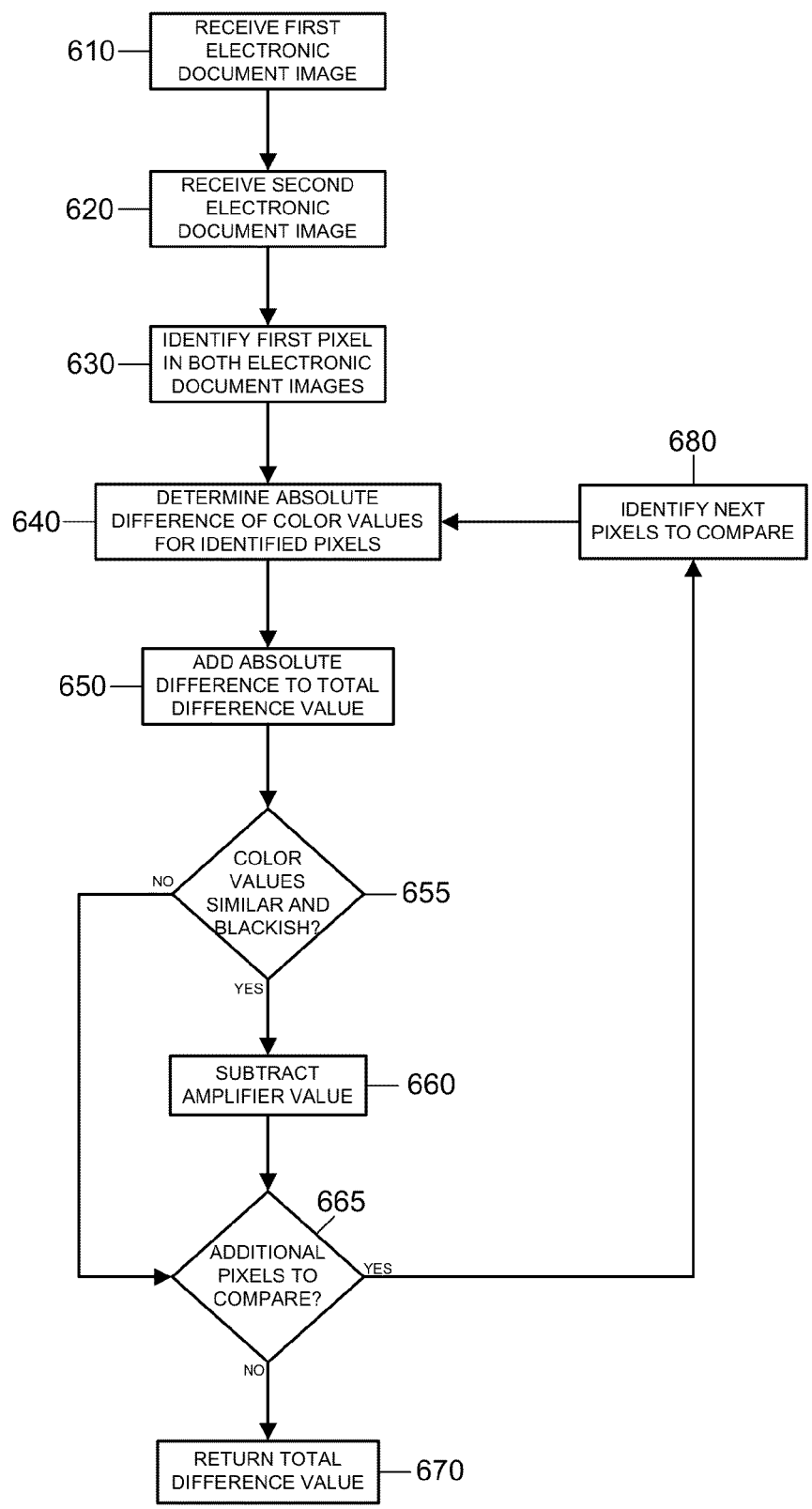

FIG. 6 is a flowchart illustrating the operations of comparing electronic document images in the system of FIG. 1, or other systems for contextualizing noisy samples by substantially minimizing noise induced variance.

Figure 7:
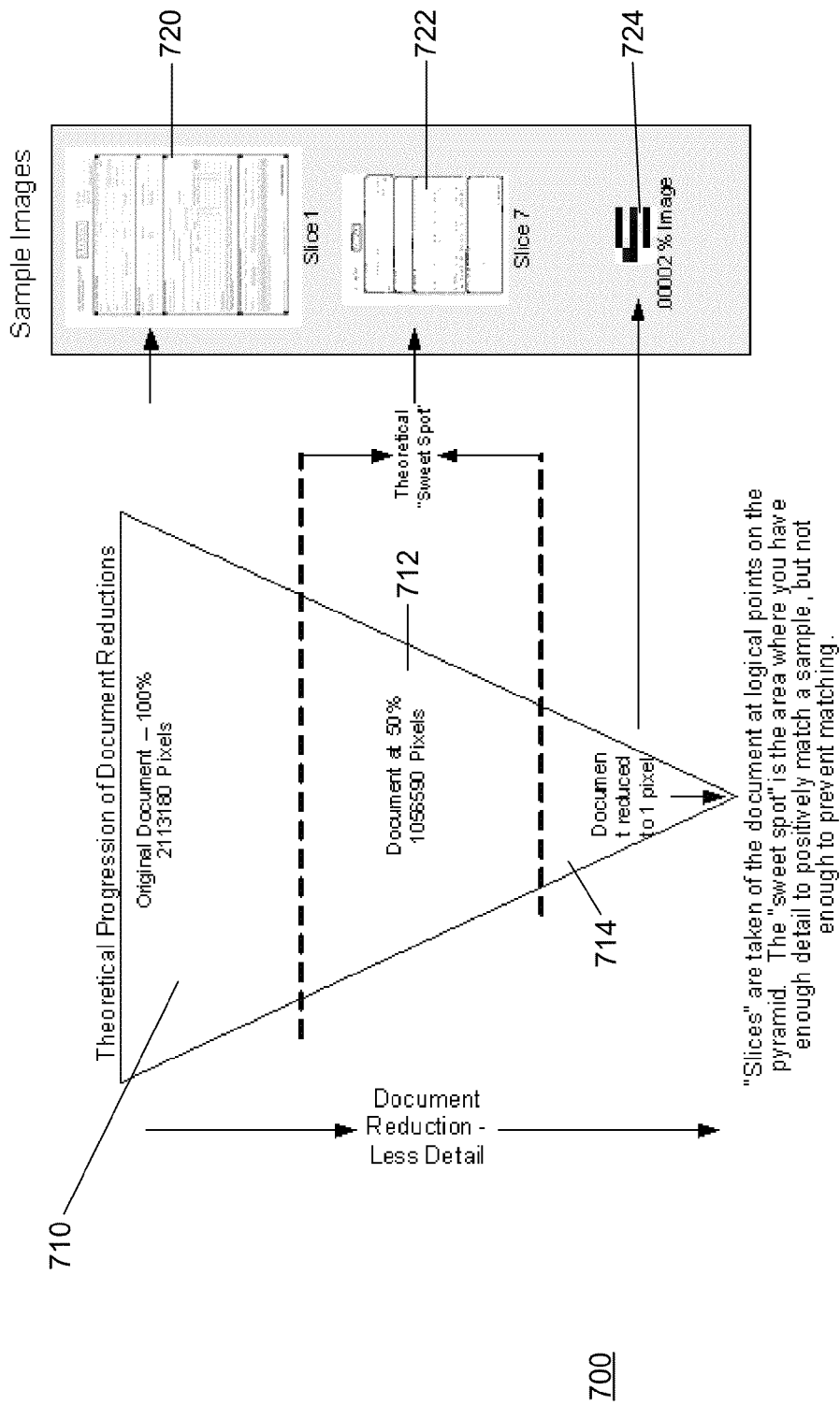

FIG. 7 is an illustration of a graph demonstrating the various levels of filtering which can be used to generate transformations of an electronic document image.

Figure 8:
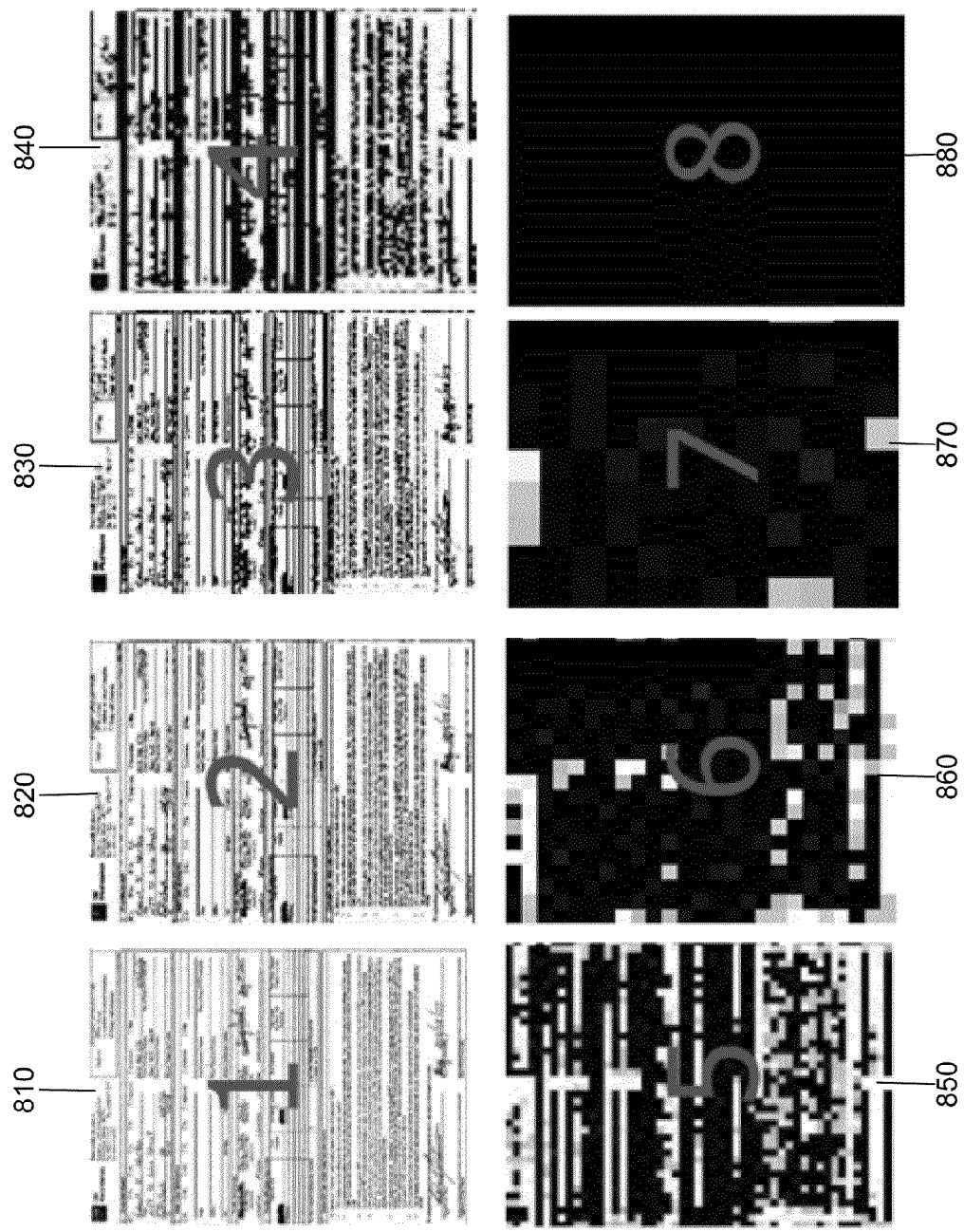

FIG. 8 is an illustration of transformations of a first electronic document image having varying levels of filtering.

Figure 9:
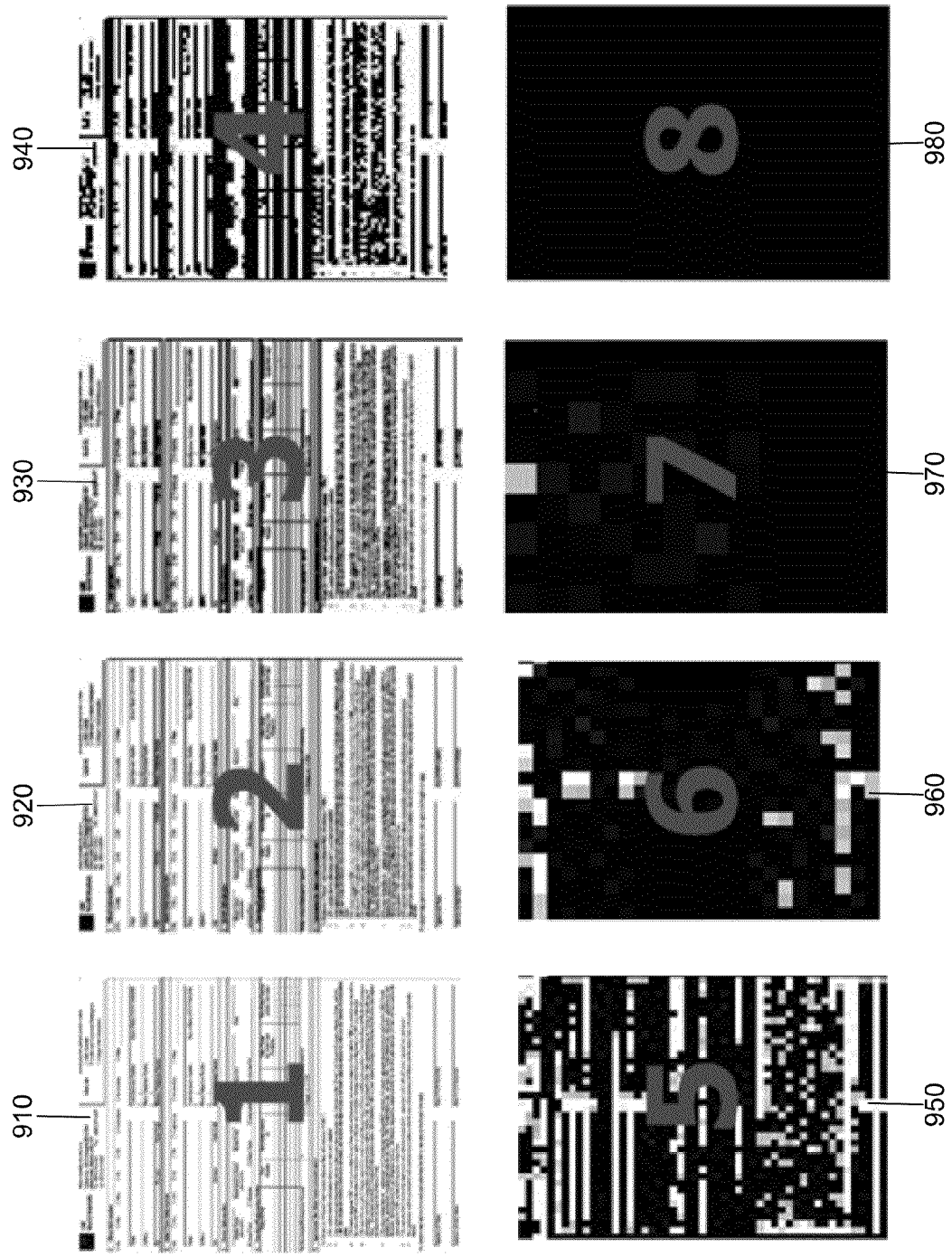

FIG. 9 is an illustration of transformations of a second electronic document image having varying levels of filtering.

Figure 10:
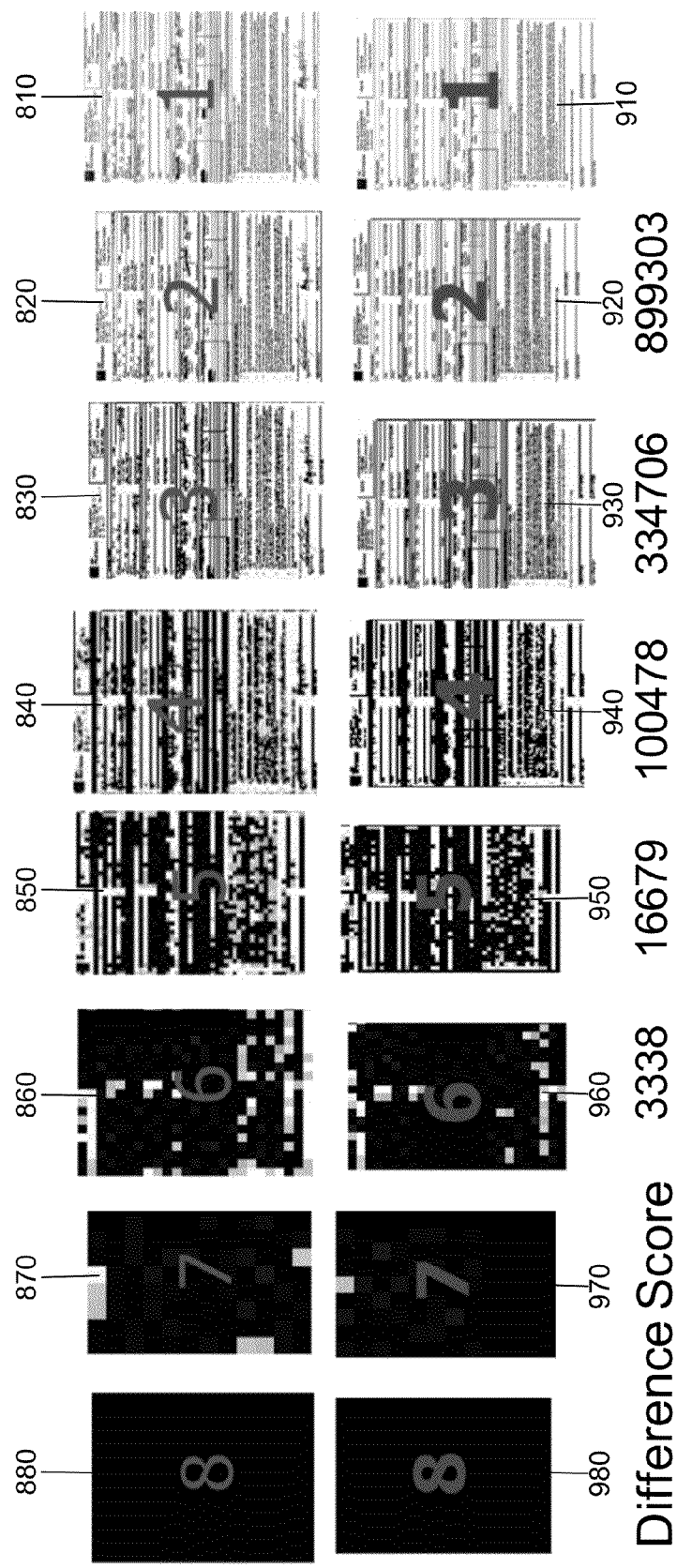

FIG. 10 is an illustration of a comparison of the transformations of the first electronic document image of FIG. 8 and the transformations of the second electronic document image of FIG. 9.

Figure 11:
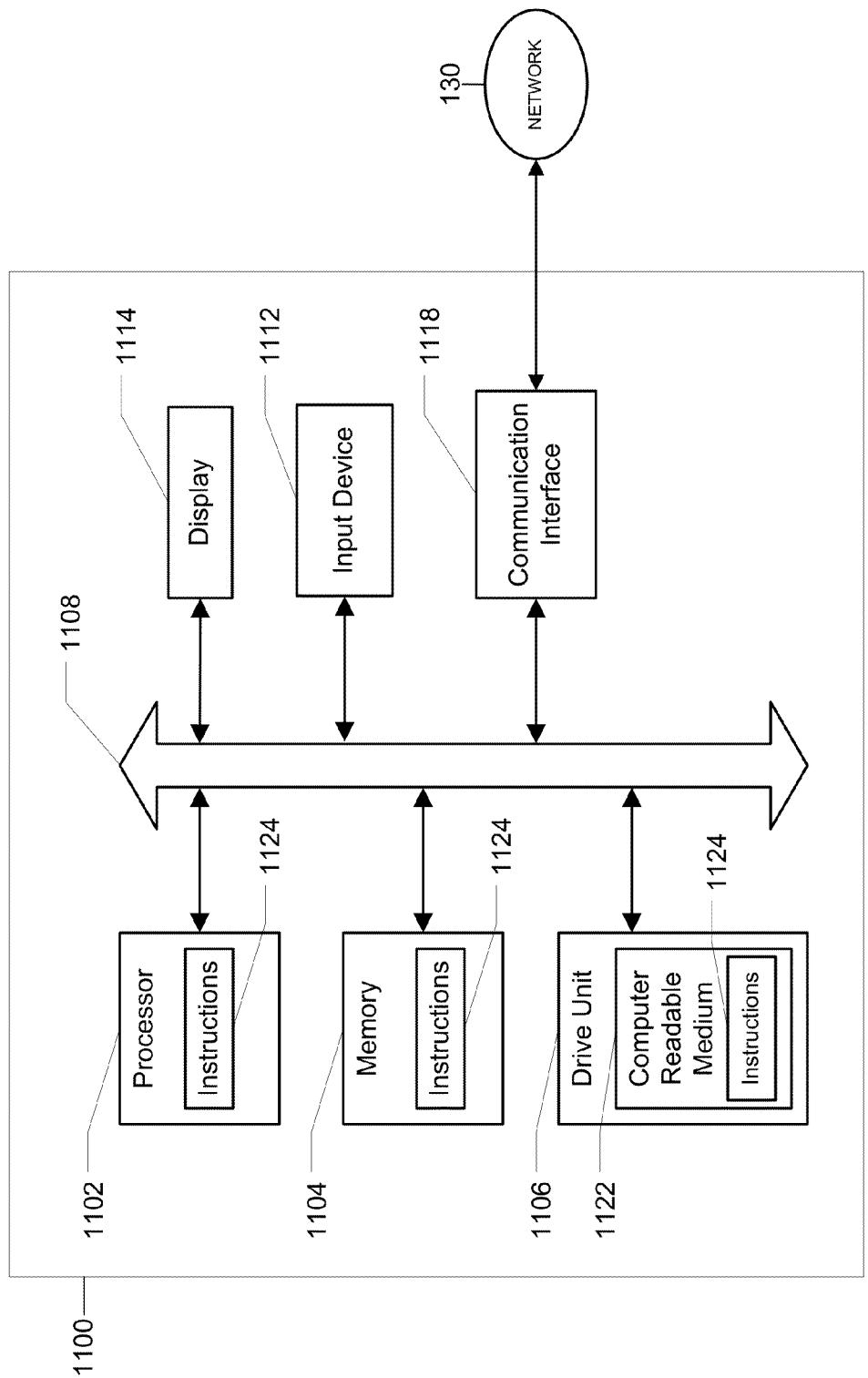

FIG. 11 is an illustration of a general computer system that may be used in the system of FIG. 1, or other systems for contextualizing noisy samples by substantially minimizing noise induced variance.

DETAILED DESCRIPTION

The disclosed embodiments relate to a system for contextualizing noisy samples by substantially minimizing noise induced variance, and more particularly, but not exclusively, to contextualizing a noisy sample having content corresponding to a known exemplar by substantially minimizing the noise induced variance between the sample and the known exemplar such that the known exemplar can be identified from the content of the sample. For illustrative purposes the principles described herein may be referenced in the specific embodiment of electronic document images; however the principles may be applied to any content, such as audio, video, images, documents, etc.

The system may be used by a document receiving organization to identify a document type corresponding to a sample electronic document image and to contextualize the sample electronic document image in accordance with the document type. The sample electronic document image may include information corresponding to a known exemplar, such as a known form, and random, or arbitrary, information, such as user-added information. The system may identify the known exemplar corresponding to the sample and may contextualize the sample in accordance with a document type of the known exemplar. The contextualization may provide context to the random information of the sample. The contextualized sample and the contextualized random information therein may be presented to an operator for processing thereof. By providing context to the random information to the operator, the system may expedite the operator's identification and/or processing of the random information.

For example, the sample electronic document image may include typographic information corresponding to form content, and variations thereto, such as handwritten information provided by a user, a distortion of the typographic information due to scanner skew, or any other variation. The system may identify exemplar electronic document images representing each of the various forms received by the document receiving organization. Each exemplar electronic document image may represent an exemplar form without any variations or random information. The variations of the sample electronic document image may be considered noise, i.e. random or arbitrary information not present in the exemplar electronic document images. The noise of the sample electronic document image may induce variance between the sample and the exemplars which may differentiate the sample from the exemplars. The system may substantially minimize the noise induced variance by generalizing the sample electronic document image and the exemplar electronic document images. For example, the system may filter the sample and exemplars using a moving average filter. The system may then compare the filtered sample electronic document image to the filtered exemplar electronic document images. Since the filtering substantially minimized the noise induced variance, the system may identify the exemplar electronic document image corresponding to the sample electronic document image based solely on the filtered form content of the sample electronic document image. The sample electronic document image may be contextualized in accordance with a document type corresponding to the identified exemplar electronic document image. The contextualized sample electronic document image may be presented to an operator for processing, or handling, thereof. For explanatory purposes, the embodiments described below relate to samples and exemplars which include electronic document images; however, the sample and exemplars may further include audio, video, documents, or any combination thereof.

The system may be used by a receiving organization to contextualize an unclassified electronic document image in accordance with a classification of a classified electronic document image. The electronic document images may each include typographic information and random information, or noise, in the form of variations to the typographic information. The classified electronic document image may have been classified in accordance with an exemplar electronic document image corresponding to the typographic information of the classified electronic document image. The system may generalize the unclassified electronic document image and the classified electronic document images in order to substantially minimize the variance between the electronic document images resulting from the noise of each. For example, the system may filter the electronic document images using a moving average filter. The system may then compare the filtered unclassified electronic document image with the filtered classified electronic document image to determine whether the typographic information of the unclassified electronic document image corresponds to the typographic information of the classified electronic document image. If the classified electronic document image corresponds to the unclassified electronic document image, the system may classify the unclassified electronic document image in accordance with the classification of the classified electronic document image. The system may then contextualize the electronic document image in accordance with the classification. The contextualized electronic document image may be presented to an operator for processing, or handling, thereof.

The system may be used to generate a set of transformations, or fingerprints, representative of an exemplar, such as an exemplar electronic document image. The system may use the set of transformations to identify noisy samples corresponding to the exemplar. Each transformation in the set of transformations may correspond to a different level of generalization, or abstraction, or level of noise of, the exemplar. The first transformation may be the exemplar itself, and the level of abstraction may increase for each successive transformation until the exemplar can no longer be generalized. For example, if the exemplar is an electronic document image, the system may recursively or iteratively filter the electronic document image using a moving average filter to generate each successive transformation. The moving average filter may separate the previous transformation into equal sized regions comprising pixels and replace each region with a single pixel having the average pixel color of the region. Thus each region has been generalized to a single pixel having the average color of the entire region, thereby generalizing the previous transformation as a whole. The system may generate additional transformations of increasing generalization until the electronic document image can no longer be generalized, e.g. when a transformation has converged to a single pixel, or otherwise can no longer be separated into equal sized regions.

The system may use the transformations of exemplars, such as exemplar electronic document images representing forms, to classify and contextualize noisy sample electronic document images. For example, the system may receive a noisy sample, such as a noisy electronic document image. The sample may include content corresponding to one of the exemplars and arbitrary or random variations, such as noise. The system may generate transformations of the sample in accordance with the procedure used to generate the transformations of the exemplars in order to substantially minimize the noise induced variance of the sample. For example, the system may recursively or iteratively filter the sample using a moving average filter to generate the sets of transformations. The system may then compare the transformations of the sample to the transformations of the exemplars to identify the exemplar corresponding to the sample. For example, the system may start by comparing the most generalized transformations of the sample and exemplar content. The system may eliminate an exemplar from the comparison when the transformation of the exemplar is not substantially similar to the corresponding transformation of the sample. The system may continue comparing each successive transformation until there is only one exemplar remaining. The system may classify the sample in accordance with the classification of the exemplar. If the system is unable to identify a single exemplar, the system may present the multiple possible corresponding exemplars, and the sample, to an operator, such as through a user interface. The operator may identify the exemplar corresponding to the sample, or may otherwise classify the sample. Alternatively, or in addition, if the system determines multiple possible corresponding exemplars, the system may incorporate information relating to one or more previously received samples, or one or more subsequently received samples, in order to determine the classification of the current sample. The system may then contextualize the sample electronic document image in accordance with the classification. The contextualized sample electronic document image may be presented to an operator for processing, or handling, thereof.

The system may be used to identify sample content as being derivative of exemplar content where the sample content includes at least a portion of the exemplar content and a variation to the portion of the exemplar content. Although the sample content includes the portion of the exemplar content, the variations of the sample content may be considered noise which results in variance between the sample content and the exemplar. The system may generalize the sample content and the exemplar content in order to substantially minimize the variance caused by the variations of the sample item. The system may then compare the generalized sample content to the generalized exemplar content in order to identify whether sample content is a derivative of the exemplar content. Since the system has substantially minimized the variance caused by the variations in the sample content, a direct comparison of the generalized sample content and generalized exemplar content may determine whether the sample content is derivative of the exemplar content.

FIG. 1 provides a general overview of a system 100 for contextualizing noisy samples by substantially minimizing noise induced variance. Not all of the depicted components may be required, however, and some implementations may include additional components. Variations in the arrangement and type of the components may be made without departing from the spirit or scope of the claims as set forth herein. Additional, different or fewer components may be provided.

The system 100 may include a computing device 120, a network 130, a data store 140, and an image acquisition device 150. The computing device 120 may display or otherwise provide an operator interface for use by an operator. The image acquisition device 150 may be used to create one or more electronic document images from one or more mediums, such as paper documents, containing typographic information corresponding to a form, and one or more variations, such as handwritten information. Alternatively, or in addition, the image acquisition device 150 may receive electronic document images from another source, such as through the network 130. The typographic information of each electronic document image may correspond to typographic information of forms of varying document types which are received by the system 100. The typographic information may be information printed, or applied, to the medium by a machine, such as a printer. The typographic information may be identified by one or more characteristics, such as typeface, color, point size, line length, leading space, tracking space and kerning space. The typographic information may indicate where handwritten information should be applied to the medium, such as by denoting lines, boxes or other indicators as visual cues to a user as to where handwritten information should be written. The variations in the form of handwritten information may be applied to the medium using a writing implement, or writing instrument, such as a pen, pencil, stylus, marker, crayon, etc. The writing implement may be a handheld device for applying information on a medium which can create a smooth, controllable line.

The image acquisition device 150 may be a device capable of converting the medium, such as a document, into an electronic document image or otherwise receiving electronic document images from another source, such as from a storage device or via a wired or wireless network. For example, the image acquisition device 150 may be a scanning or camera device. The image acquisition device 150 may be in communication with the computing device 120 and the data store 140 through the network 130. Alternatively or in addition, the image acquisition device 150 may be in direct communication with one or more of the computing device 120 or the data store 140, such as through a universal serial bus (USB) connection, a serial connection, or generally any wired or wireless data connection. Alternatively or in addition, the image acquisition device 150 may be combined with one or more of the computing device 120 or the data store 140. For example, the image acquisition device 150 may be a handheld device with a camera or scanning device which can capture an image of a document, such as an iPhone™ available from Apple, Inc, smartphones containing a camera or scanning device, a tablet device with a camera or scanning device, or generally any handheld device capable of generating an electronic document image from a physical document. The image acquisition device 150 may cause variations in the electronic document images, such as through scanner skew, image noise, or any other variations which may be caused by the image acquisition device 150.

The operator may be a person responsible for monitoring the progress of the system 100, such as via an operator interface (not shown). The operator may use the operator interface to review the electronic document images generated by the image acquisition device 150. If the system 100 is unable to identify a document type corresponding to a received electronic document image, the operator may manually identify the document type corresponding to the received electronic document image. The system 100 may contextualize the received electronic document image in accordance with the document type and may present the contextualized electronic document image to the operator.

The data store 140 may be operative to store data or information, such as data relating to the electronic document images, such as transformations of the electronic document images, the typographic information, the document type characterizing an electronic document image, or generally any data related to the system 100. The data store 140 may also store information describing known exemplars, such as electronic document images representing blank forms used by the organization. For example, the data store 140 may store a set of transformations describing each exemplar. The set of transformations may be generated by recursively filtering the electronic document images using a moving average filter. The steps of generating transformations for an electronic document image are discussed in more detail in FIG. 5 below.

The data store 140 may include one or more relational databases or other data stores that may be managed using various known database management techniques, such as, for example, SQL and object-based techniques. Alternatively or in addition the data store 140 may be implemented using one or more of the magnetic, optical, solid state or tape drives, or other storage medium available now or later developed. The data store 140 may be in communication with the computing device 120 through the network 130. For example, the data store 140 may be a database server running database software, such as MICROSOFT SQL SERVER®, ORACLE®, IBM DB2® or any other database software, relational or otherwise. Alternatively or in addition, the data store 140 may be in communication with other computing devices, such as servers, through the network 130.

The network 130 may include wide area networks (WAN), such as the interne, local area networks (LAN), campus area networks, metropolitan area networks, or any other networks that may allow for data communication. The network 130 may include the Internet and/or the network 130 may be divided into sub-networks. The sub-networks may allow access to all of the other components connected to the network 130 in the system 100, or the sub-networks may restrict access between the components connected to the network 130. The network 130 may be regarded as a public or private network connection and may include, for example, a virtual private network or an encryption or other security mechanism employed over the public Internet, or the like.

The computing device 120 may be connected to the network 130 in any configuration that supports data transfer. This may include a data connection to the network 130 that may be wired or wireless. The computing device 120 may run a web application on any platform that supports web content, such as a web browser or a computer, a mobile phone, personal digital assistant (PDA), pager, network-enabled television, digital video recorder, such as TIVO®, video game console/device, automobile and/or any appliance or device capable of data communications.

The computing device 120 may be a machine that has a processor, memory, a display, a user interface and a communication interface, such as the computing device described in FIG. 11 below. The processor may be operatively coupled with the memory, display and the interfaces and may perform tasks at the request of the standalone application or the underlying operating system. Herein, the phrase "coupled with" is defined to mean directly connected to or indirectly connected through one or more intermediate components. Such intermediate components may include both hardware and software based components. The memory may be capable of storing data. The display may be operatively coupled with the memory and the processor and may be capable of displaying information to the operator. The user interface may be operatively coupled with the memory, the processor, and the display and may be capable of interacting with an operator. The communication interface may be operatively coupled with the memory, and the processor, and may be capable of communicating through the network 130 with the image acquisition device 150. The standalone application may be programmed in any programming language that supports communication protocols. These languages may include: SUN JAVA®, C++, C#, ASP, SUN JAVASCRIPT®, asynchronous SUN JAVASCRIPT®, or ADOBE FLASH ACTIONSCRIPT®, amongst others.

The computing device 120 may be any mobile device that has a data connection and may run a mobile application. The data connection may be a cellular connection, a wireless data connection, an interne connection, an infra-red connection, a Bluetooth connection, or any other connection capable of transmitting data. For example, the mobile application may be an application running on an iPhone™ available from Apple, Inc.

Figure 2:
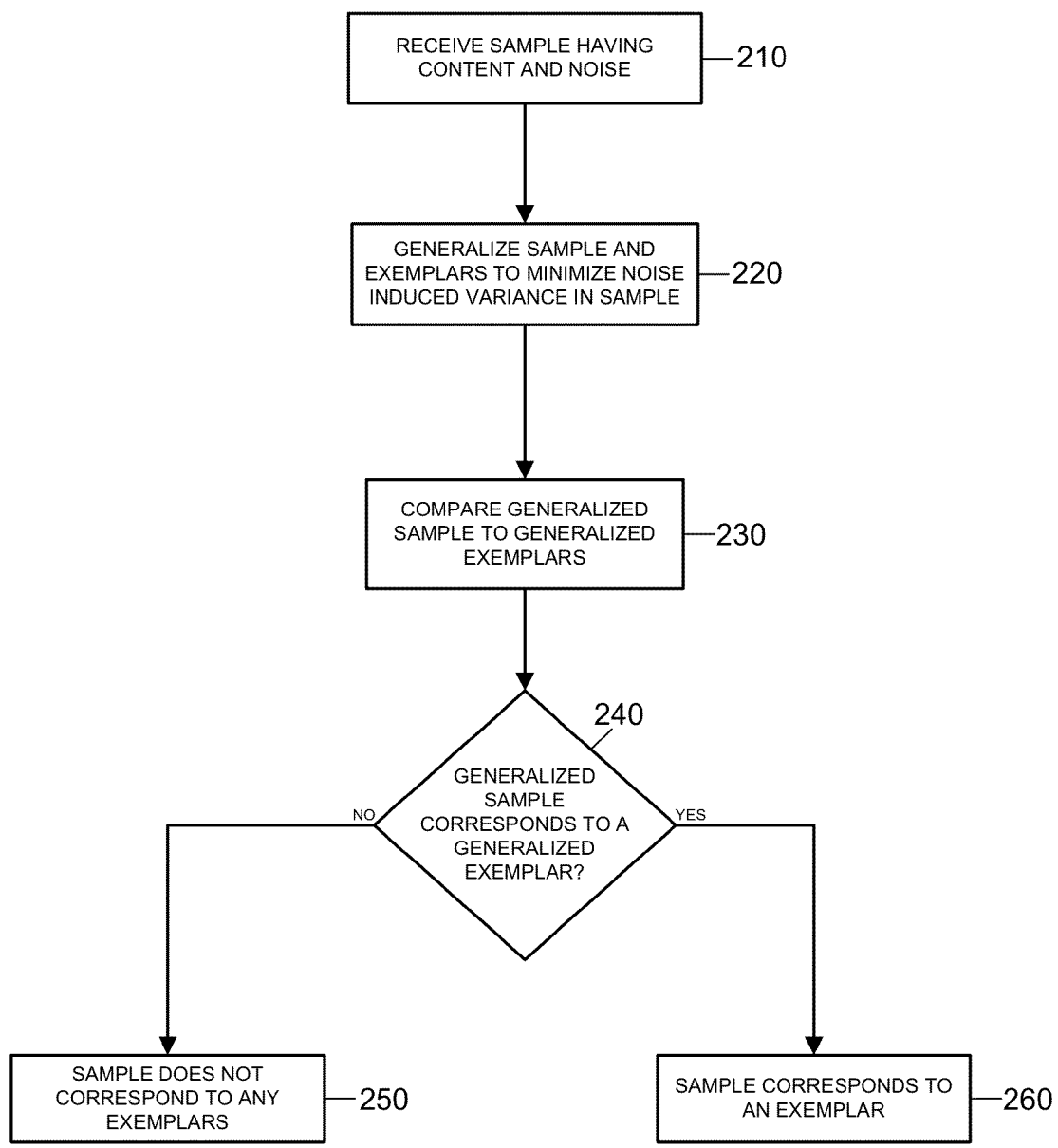
FIG. 2 is a flowchart illustrating the operations of contextualizing noisy samples by substantially minimizing noise induced variance in the system of FIG. 1, or other systems for contextualizing noisy samples by substantially minimizing noise induced variance.

FIG. 2 is a flowchart illustrating the operations of contextualizing noisy samples by substantially minimizing noise induced variance in the system of FIG. 1, or other systems for contextualizing noisy samples by substantially minimizing noise induced variance. The steps of FIG. 2 are described as being performed by the computing device 120. However, the steps may be performed by the processor of the computing device 120, or by any other hardware component of the computing device 120. Alternatively the steps may be performed by an external hardware component.

At step 210, the computing device 120 receives a sample having content and noise, such as an image, a video segment, an audio segment, a document, or generally any content. For example, the computing device 120 may receive a sample which includes at least a portion of a known exemplar, such as an exemplar representative of copyrighted content, and at least one variation to the portion of the known exemplar, such as noise. The noise of the sample may induce variance which differentiates the sample from one or more of the known exemplars stored in the data store 140. At step 220, the computing device 120 generalizes the sample and the known exemplars in order to substantially minimize the noise induced variance. For example, the system 100 may generalize the sample and the exemplars such that the noise of the sample is non-determinative when comparing the sample to the exemplars. Thus, the noise induced variance of the sample may be substantially minimized when the noise induced variance is non-determinative when comparing the sample to the exemplars. Alternatively or in addition, the noise induced variance may be substantially minimized when the noise induced variance does not prevent, or interfere, with identifying one of the exemplars as corresponding to the content of the sample. In the case of a sample and exemplars including images, the computing device 120 may filter the sample and exemplars using a moving average filter in order to substantially minimize the noise induced variance. Generalizing samples and exemplars is discussed in more detail in FIG. 7 below.

At step 230, the computing device 120 compares the generalized sample to each of the generalized exemplars to determine whether the content of the received sample corresponds to one or more of the exemplars. In the case of a sample and exemplars including electronic document images, the steps of comparing are discussed in more detail in FIG. 6 below. At step 240, the computing device 120 determines whether the generalized sample corresponds to one or more of the generalized exemplars based on the comparing of step 230. If, at step 240, the computing device 120 determines that one of the exemplars corresponds to the sample, the computing device 120 moves to step 260. At step 260, the computing device 120 stores an indication that the sample may include at least a portion of the corresponding known exemplar. Alternatively, or in addition, in the case of electronic document images, the computing device 120 may contextualize the sample in accordance with a document type of the corresponding exemplar. The contextualization of the sample may add context to the variations, or noise, of the sample electronic document image. The contextualized sample electronic document image may be presented to the operator for handling, or processing, thereof.

If, at step 240, the computing device 120 determines that none of the exemplars correspond to the sample, the computing device 120 moves to step 250. At step 250, the computing device 120 stores an indication that the sample does not include content from one or more of the exemplars and therefore is not a derivative of one or more of the exemplars. Alternatively, or in addition, in the case of electronic document images, the computing device 120 may present the sample electronic document image to the operator along with an indication that the sample electronic document image could not be classified. The computing device 120 may receive an indication of the classification of the electronic document image from the operator. The computing device 120 may contextualize the electronic document image in accordance with the received classification and may present the contextualized sample electronic document image to the operator for processing, or handling, thereof.

Figure 3:
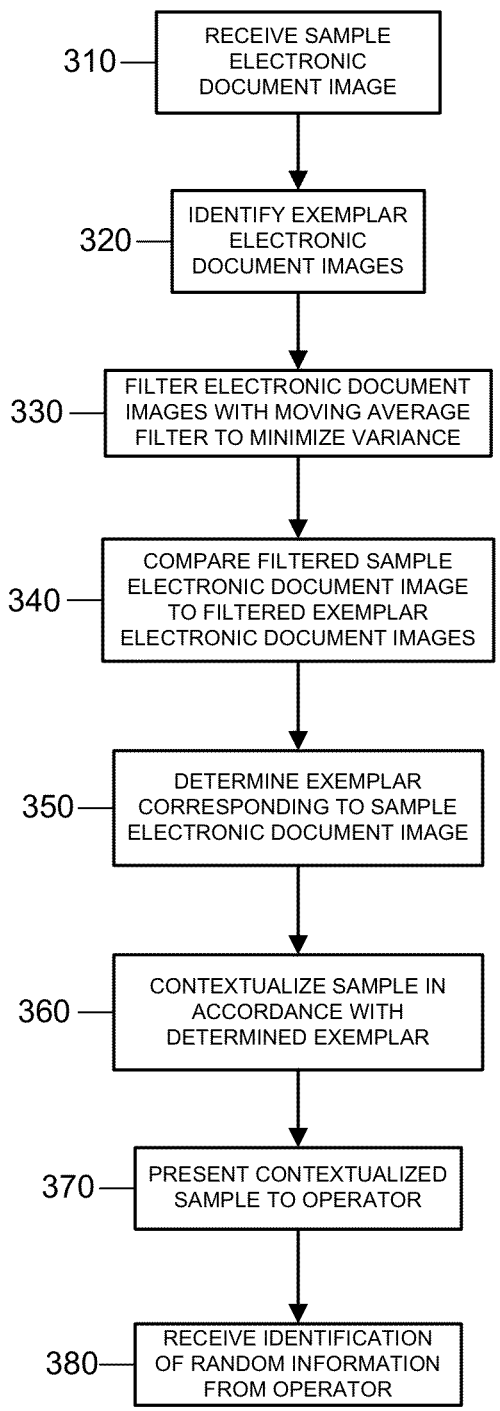
FIG. 3 is a flowchart illustrating the operations of classifying noisy electronic document images in the system of FIG.

FIG. 3 is a flowchart illustrating the operations of classifying noisy electronic document images in the system of FIG. 1, or other systems for contextualizing noisy samples by substantially minimizing noise induced variance. The steps of FIG. 3 are described as being performed by the computing device 120. However, the steps may be performed by the processor of the computing device 120, or by any other hardware component of the computing device 120. Alternatively the steps may be performed by an external hardware component.

At step 310, the computing device 120 receives a sample electronic document image, such as an electronic document image generated by the image acquisition device 150, or an electronic document image received from another source. The sample electronic document image may include typographic information and noise or random information, such as one or more variations to the typographic information. For example, the received electronic document image may include typographic information corresponding to a known exemplar and variations corresponding to handwritten information provided by a user. At step 320, the computing device 120 identifies one or more known exemplar electronic document images. For example, the exemplar electronic document images may each correspond to a type of form received by the system 100 and may include the typographic information of the form without any noise or random information, such as variations. At step 330, the computing device 120 filters the sample and the known exemplars using a moving average filter in order to substantially minimize noise induced variance between the sample and the known exemplars. The steps of filtering the sample and exemplar using a moving average filter are discussed in more detail in FIG. 5 below.

At step 340, the computing device 120 compares the filtered sample to the filtered exemplars to determine whether the typographic information of the sample corresponds to typographic information of one or more of the known exemplars. The steps of comparing the sample electronic document image to the exemplar electronic document images are discussed in more detail in FIG. 6 below. At step 350, the computing device 120 determines the exemplar electronic document image corresponding to the sample electronic document image. Since any variations in the received electronic document image have been rendered non-determinative by the filtering, the computing device 120 can determine the known exemplar electronic document image corresponding to the sample electronic document image based on the defocused typographic information of the electronic document images.

At step 360, the computing device 120 contextualizes the sample electronic document image in accordance with a document type of the known exemplar determined at step 350. At step 370, the computing device 120 presents the contextualized sample electronic document image to the operator, such as through a user interface. At step 380, the computing device 120 may receive an identification of the contextualized random information from the operator, such as through the user interface.

FIG. 4 is a flowchart illustrating the operations of identifying noisy electronic document images using transformations of the electronic document image having varying levels of filtering in the system of FIG. 1, or other systems for contextualizing noisy samples by substantially minimizing noise induced variance. The steps of FIG. 4 are described as being performed by the computing device 120. However, the steps may be performed by the processor of the computing device 120, or by any other hardware component of the computing device 120. Alternatively the steps may be performed by an external hardware component.

At step 410, the computing device 120 receives a sample electronic document image, such as an electronic document image generated by the image acquisition device 150, or an electronic document image received from another source. The sample electronic document image may include typographic information, and noise, or random information, such as one or more variations to the typographic information. For example, the sample electronic document image may include typographic information corresponding to a form processed by a receiving organization operating the system 100 and variations to the typographic information corresponding to handwritten information provided by a user.

At step 420, the computing device 120 pre-processes the sample electronic document image. For example, the computing device 120 may convert the color of all of the pixels of the sample electronic document image to either absolute black or absolute white. The computing device 120 may also crop the outside/margin of the sample electronic document image and may resize the sample electronic document image to a size consistent with the forms processed by the receiving organization operating the system 100.

At step 430, the computing device 120 may generate a set of transformations for the sample electronic document image. For example, the set of transformations may include varying abstractions, or resolutions, of the electronic document image generated by recursively applying a moving average filter to the sample electronic document image. The steps of generating a set of transformations for an electronic document image are discussed in more detail in FIG. 5 below. At step 435, the computing device 120 identifies sets of transformations corresponding to known exemplar electronic document images, such as by retrieving the sets of transformations from the data store 140. For example, the known exemplar electronic document images may include typographic information of forms processed by the receiving organization operating the system 100 without any noise, or random information, such as variations. The sets of transformations of the known exemplar electronic document images and the set of transformations of the sample electronic document image may each include transformations of the same resolutions, or levels of abstractions. At step 440, the computing device 120 identifies the transformations of the sample and exemplar electronic document images having the highest level of filtering.

At step 450, the computing device 120 compares the identified transformation of the sample electronic document image to the identified transformations of each of the exemplar electronic document images. At step 460, the computing device 120 eliminates any exemplar electronic document images from the comparison having transformations which are not substantially similar to the transformation of the sample electronic document image. For example, the computing device 120 may identify a matching criteria, or threshold. If the transformation of an exemplar electronic document image does not satisfy the matching criteria, the exemplar electronic document image may be eliminated from the comparison. For example, the computing device 120 may calculate a difference value for the transformation of each of the exemplar electronic document images as compared to the transformation of the sample electronic document image. The matching criteria may be based on whether the difference value of each exemplar is above or below a threshold value. The steps of calculating exemplary difference values are discussed in more detail in FIG. 6 below.

At step 465, the computing device 120 determines whether a single exemplar electronic document image remains in the comparison. If at, step 465, the computing device 120 determines that multiple exemplar electronic document images remain, the computing device 120 moves to step 485. At step 485, the computing device 120 determines whether additional transformation resolutions exist in the set of transformations of the sample electronic document image which have not yet been compared. If, at step 485, the computing device 120 determines that additional transformations exist, the computing device 120 moves to step 480. At step 480, the computing device 120 identifies the transformations of the sample and the exemplar having the next highest level of filtering. The computing device 120 then repeats steps 450-485 for the transformations identified in step 480.

If, at step 485, the computing device 120 determines that there are no additional transformations of the received electronic document image yet to be compared, the computing device 120 moves to step 490. At step 490, the computing device 120 presents an indication to the operator that a single exemplar corresponding to the sample electronic document image could not be identified. The computing device 120 may present the sample electronic document image and any possible corresponding exemplars to the operator. The operator may identify the exemplar corresponding to the sample electronic document image, or may otherwise identify a classification of the sample electronic document image. The computing device 120 may classify the sample electronic document image in accordance with the classification and may present the contextualized electronic document image to the operator. Alternatively or in addition, the computing device 120 may use information obtained from one or more previously received sample electronic document images, or one or more subsequently received sample electronic document images, to determine a classification of the current sample electronic document image. For example, there may be an expected pattern of electronic documents to be received. The expected pattern, in addition to the identification of one or more sequentially received sample electronic document images, may be used to determine a classification of the sample electronic document image received at step 410.

If, at step 465, the computing device 120 determines that there is only one exemplar remaining which corresponds to the sample electronic document image, the computing device 120 moves to step 470. At step 470, the computing device 120 contextualizes the sample in accordance with a document type of the identified exemplar. The contextualized sample electronic document image may be presented to the operator, such as via an interface. The operator may provide an identification of the variations of the electronic document image or may otherwise process or handle the contextualized sample electronic document image.

FIG. 5 is a flowchart illustrating the operations of generating transformations of an electronic document image having varying levels of filtering in the system of FIG. 1, or other systems for contextualizing noisy samples by substantially minimizing noise induced variance. The steps of FIG. 5 are described as being performed by the computing device 120. However, the steps may be performed by the processor of the computing device 120, or by any other hardware component of the computing device 120. Alternatively the steps may be performed by an external hardware component.

At step 510, the computing device 120 may identify an electronic document image for which a set of transformations is to be generated. For example, the computing device 120 may receive a sample electronic document image which is to be compared against sets of transformations of known exemplar electronic document images, such as electronic document images representing blank forms processed by a receiving organization operating the system 100. At step 520, the computing device 120 pre-processes the electronic document image. For example, the computing device 120 may convert the color of all of the pixels of the electronic document image to either absolute black or absolute white. The computing device 120 may also crop the outside/margin of the electronic document image and may resize the electronic document image to a size consistent with the forms processed by the receiving organization operating the system 100.

At step 530, the computing device 120 stores a transformation of the pre-processed electronic document image at full resolution, i.e. the resolution of the electronic document image as received by the computing device 120. At step 540, the computing device 120 separates the previously stored transformation into equal sized regions. For example, each region may include an equal number of pixels, such as four pixels. At step 550, the computing device 120 determines an average color of the pixels in each region. The color of the pixels may be represented by a numerical value. For example, black may be represented by 0, while white may be represented by 255. The average color may be determined by determining an average of the numerical values representing the colors of the pixels of each region. At step 560, the computing device 120 may transform each pixel of each region to have the average pixel color of the region. At step 565, the computing device 120 may compress each region to a single pixel in order to reduce the amount of space required to store the transformations in the data store 140. Thus, at step 565, the resolution of the image may be reduced by a factor of the number of pixels in each region, e.g. if each region includes four pixels, the resolution of the image will be reduced by a fourth. Alternatively, or in addition, the computing device 120 may skip step 565 and store each successively filtered transformation at the same resolution.

At step 570, the computing device 120 may store the transformation generated at step 565. For example, the computing device 120 may store the transformation in the data store 140. At step 580, the computing device 120 determines whether the transformation stored at step 570 includes pixels having different colors, or is otherwise capable of being further generalized to generate additional transformations. If, at step 580, the computing device 120 determines that additional transformations may be generated, then the computing device 120 returns to step 540 and repeats steps 540-580. If, at step 580, the computing device 120 determines that the transformation stored at step 570 only contains a single pixel color, or otherwise cannot be further generalized, then the computing device 120 moves to step 590. At step 590, the computing device 120 stores an association between the set of generated transformations and the received electronic document image.

FIG. 6 is a flowchart illustrating the operations of comparing electronic document images in the system of FIG. 1, or other systems for contextualizing noisy samples by substantially minimizing noise induced variance. The steps of FIG. 6 are described as being performed by the computing device 120. However, the steps may be performed by the processor of the computing device 120, or by any other hardware component of the computing device 120. Alternatively the steps may be performed by an external hardware component.

At step 610, the computing device 120 receives a first electronic document image to be compared. At step 620, the computing device 120 receives a second electronic document image to be compared to the first electronic document image received at step 610. At step 630, the computing device 120 identifies the first pixel in the first electronic document image and the first pixel in the second electronic document image. For example, the first pixel may be the upper-left most pixel in the electronic document images. Alternatively or in addition, the computing device 120 may pre-process the electronic document images prior to comparing the first pixels, such as by cropping or centering the electronic document images. At step 640, the computing device 120 determines the absolute difference of the color values of the two identified pixels. For example, the computing device 120 may determine the absolute value of the result of subtracting the color value of the first pixel of the first electronic document image from the color value of the first pixel of the second electronic document image. At step 650, the computing device 120 may add the absolute difference to a total difference value for the comparison.

At step 655, the computing device 120 determines whether the color values of the identified pixels are substantially similar, and whether the color values of the identified pixels are representative of a substantially black color. For example, the color values of the identified pixels may be substantially the same if the absolute value of the difference between the color values satisfies a criterion, such as meeting a minimum value. If, at step 655, the computing device 120 determines that the color values of the identified pixels are substantially similar and are representative of a substantially black color, the computing device 120 moves to step 660. At step 660, the computing device 120 subtracts an amplifier value from the total difference value in order to increase the importance of pixels having a substantially similar color value which is representative of a substantially black color.

If, at step 665, the computing device 120 determines that the color values of the identified pixels are not substantially similar and/or are not representative of a substantially black color, the computing device 120 moves to step 665. At step 665, the computing device 120 determines whether there are additional pixels to compare between the first electronic document image and the second electronic document image. If, at step 665, the computing device 120 determines there are additional pixels to compare, the computing device 120 moves to step 680. At step 680, the computing device 120 identifies the next pixels in the first and second electronic document images to compare. The computing device 120 may then repeat steps 640-665 for the next pixel.

If, at step 665, the computing device 120 determines there are no additional pixels to compare from the first and second electronic document images, the computing device 120 moves to step 670. At step 670, the computing device 120 returns the total difference value indicative of the similarity of the first and second electronic document images. A low total difference value may be indicative of substantially similar electronic document images, while a high total difference value may be indicative of substantially dissimilar electronic document images.

FIG. 7 is an illustration of a graph 700 demonstrating the various levels of filtering which can be used to generate transformations of an electronic document image. The graph 700 includes a first segment of image resolutions 710, a second segment of image resolutions 712, a third segment of image resolutions 714, a first sample image 720, a second sample image 722, and a third sample image 724. The first segment of image resolutions 710 may include approximately the first third of possible image resolutions, including a transformation of the original resolution of the image. The second segment of image resolutions 712 includes the second third of possible image resolutions, and the third segment of image resolutions 714 includes the last third of possible image resolutions, including a transformation having a single pixel. Thus, the first segment of image resolutions 710 may represent the least filtered transformations, while the third segment of image resolutions 714 may represent the most filtered transformations. The first sample image 720 displays the electronic document image within the first third of possible image resolutions 710. The second sample image 722 displays the electronic document image within the second third of possible image resolutions. The third sample image 724 displays an electronic document image within the third of possible image resolutions.

FIG. 8 is an illustration of transformations of a first electronic document image having varying levels of filtering. FIG. 8 displays transformations 810-880 of increasing levels of filtering of the first electronic document image. The transformation 810 may be the least filtered transformation, e.g. the highest resolution transformation or the least generalized transformation, while the transformation 880 may be the most filtered transformation, e.g. the lowest resolution transformation or the most generalized transformation. The transformations 810-880 of the first electronic document image can be generated in accordance with the steps of FIG. 5 discussed above.

FIG. 9 is an illustration of transformations of a second electronic document image having varying levels of filtering. FIG. 9 displays transformations 910-980 of increasing levels of filtering of the second electronic document image. The transformation 910 may be the least filtered transformation, e.g. the highest resolution transformation or the least generalized transformation, while the transformation 980 may be the most filtered transformation, e.g. the lowest resolution transformation or the most generalized transformation. The transformations 910-980 of the second electronic document image can be generated in accordance with the steps of FIG. 5 discussed above.

FIG. 10 is an illustration of a comparison of the transformations of the first electronic document image of FIG. 8 and the transformations of the second electronic document image of FIG. 9. FIG. 10 illustrates the transformations 810-880 of the first electronic document image as compared to the transformations 910-980 of the second electronic document image. FIG. 10 illustrates that transformations of approximately equivalent levels of filtering are compared against one another, such as the transformations 810, 910, the transformations 820, 920, etc. The total difference values for the comparisons of the transformations are displayed below the transformations 910-980 of the second electronic document image. The total difference values for the comparison of each transformation may be determined in accordance with the steps of FIG. 6 discussed above. FIG. 10 illustrates that total difference values grow smaller as the level of filtering of the electronic document images increases and the transformations of the electronic document images begin to converge.

FIG. 11 illustrates a general computer system 1100, which may represent the computing device 120, or any of the other computing devices referenced herein. The computer system 1100 may include a set of instructions 1124 that may be executed to cause the computer system 1100 to perform any one or more of the methods or computer based functions disclosed herein. The computer system 1100 may operate as a standalone device or may be connected, e.g., using a network, to other computer systems or peripheral devices.

In a networked deployment, the computer system may operate in the capacity of a server or as a client user computer in a server-client user network environment, or as a peer computer system in a peer-to-peer (or distributed) network environment. The computer system 1100 may also be implemented as or incorporated into various devices, such as a personal computer (PC), a tablet PC, a set-top box (STB), a personal digital assistant (PDA), a mobile device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions 1124 (sequential or otherwise) that specify actions to be taken by that machine. In a particular embodiment, the computer system 1100 may be implemented using electronic devices that provide voice, video or data communication. Further, while a single computer system 1100 may be illustrated, the term "system" shall also be taken to include any collection of systems or subsystems that individually or jointly execute a set, or multiple sets, of instructions to perform one or more computer functions.

As illustrated in FIG. 11, the computer system 1100 may include a processor 1102, such as, a central processing unit (CPU), a graphics processing unit (GPU), or both. The processor 1102 may be a component in a variety of systems. For example, the processor 1102 may be part of a standard personal computer or a workstation. The processor 1102 may be one or more general processors, digital signal processors, application specific integrated circuits, field programmable gate arrays, servers, networks, digital circuits, analog circuits, combinations thereof, or other now known or later developed devices for analyzing and processing data. The processor 1102 may implement a software program, such as code generated manually (i.e., programmed).

The computer system 1100 may include a memory 1104 that can communicate via a bus 1108. The memory 1104 may be a main memory, a static memory, or a dynamic memory. The memory 1104 may include, but may not be limited to computer readable storage media such as various types of volatile and non-volatile storage media, including but not limited to random access memory, read-only memory, programmable read-only memory, electrically programmable read-only memory, electrically erasable read-only memory, flash memory, magnetic tape or disk, optical media and the like. In one case, the memory 1104 may include a cache or random access memory for the processor 1102. Alternatively or in addition, the memory 1104 may be separate from the processor 1102, such as a cache memory of a processor, the system memory, or other memory. The memory 1104 may be an external storage device or database for storing data. Examples may include a hard drive, compact disc ("CD"), digital video disc ("DVD"), memory card, memory stick, floppy disc, universal serial bus ("USB") memory device, or any other device operative to store data. The memory 1104 may be operable to store instructions 1124 executable by the processor 1102. The functions, acts or tasks illustrated in the figures or described herein may be performed by the programmed processor 1102 executing the instructions 1124 stored in the memory 1104. The functions, acts or tasks may be independent of the particular type of instructions set, storage media, processor or processing strategy and may be performed by software, hardware, integrated circuits, firmware, micro-code and the like, operating alone or in combination. Likewise, processing strategies may include multiprocessing, multitasking, parallel processing and the like.

The computer system 1100 may further include a display 1114, such as a liquid crystal display (LCD), an organic light emitting diode (OLED), a flat panel display, a solid state display, a cathode ray tube (CRT), a projector, a printer or other now known or later developed display device for outputting determined information. The display 1114 may act as an interface for the user to see the functioning of the processor 1102, or specifically as an interface with the software stored in the memory 1104 or in the drive unit 1106.

Additionally, the computer system 1100 may include an input device 1112 configured to allow a user to interact with any of the components of system 1100. The input device 1112 may be a number pad, a keyboard, or a cursor control device, such as a mouse, or a joystick, touch screen display, remote control or any other device operative to interact with the system 1100.

The computer system 1100 may also include a disk or optical drive unit 1106. The disk drive unit 1106 may include a computer-readable medium 1122 in which one or more sets of instructions 1124, e.g. software, can be embedded. Further, the instructions 1124 may perform one or more of the methods or logic as described herein. The instructions 1124 may reside completely, or at least partially, within the memory 1104 and/or within the processor 1102 during execution by the computer system 1100. The memory 1104 and the processor 1102 also may include computer-readable media as discussed above.

The present disclosure contemplates a computer-readable medium 1122 that includes instructions 1124 or receives and executes instructions 1124 responsive to a propagated signal; so that a device connected to a network 130 may communicate voice, video, audio, images or any other data over the network 130. Further, the instructions 1124 may be transmitted or received over the network 130 via a communication interface 1118. The communication interface 1118 may be a part of the processor 1102 or may be a separate component. The communication interface 1118 may be created in software or may be a physical connection in hardware. The communication interface 1118 may be configured to connect with a network 130, external media, the display 1114, or any other components in system 1100, or combinations thereof. The connection with the network 130 may be a physical connection, such as a wired Ethernet connection or may be established wirelessly as discussed below. Likewise, the additional connections with other components of the system 1100 may be physical connections or may be established wirelessly.

The network 130 may include wired networks, wireless networks, or combinations thereof. The wireless network may be a cellular telephone network, an 802.11, 802.16, 802.20, or WiMax network. Further, the network 130 may be a public network, such as the Internet, a private network, such as an intranet, or combinations thereof, and may utilize a variety of networking protocols now available or later developed including, but not limited to TCP/IP based networking protocols.

The computer-readable medium 1122 may be a single medium, or the computer-readable medium 1122 may be a single medium or multiple media, such as a centralized or distributed database, and/or associated caches and servers that store one or more sets of instructions. The term "computer-readable medium" may also include any medium that may be capable of storing, encoding or carrying a set of instructions for execution by a processor or that may cause a computer system to perform any one or more of the methods or operations disclosed herein.

The computer-readable medium 1122 may include a solid-state memory such as a memory card or other package that houses one or more non-volatile read-only memories. The computer-readable medium 1122 also may be a random access memory or other volatile re-writable memory. Additionally, the computer-readable medium 1122 may include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that may be a tangible storage medium. Accordingly, the disclosure may be considered to include any one or more of a computer-readable medium or a distribution medium and other equivalents and successor media, in which data or instructions may be stored.

Alternatively or in addition, dedicated hardware implementations, such as application specific integrated circuits, programmable logic arrays and other hardware devices, may be constructed to implement one or more of the methods described herein. Applications that may include the apparatus and systems of various embodiments may broadly include a variety of electronic and computer systems. One or more embodiments described herein may implement functions using two or more specific interconnected hardware modules or devices with related control and data signals that may be communicated between and through the modules, or as portions of an application-specific integrated circuit. Accordingly, the present system may encompass software, firmware, and hardware implementations.

The methods described herein may be implemented by software programs executable by a computer system. Further, implementations may include distributed processing, component/object distributed processing, and parallel processing. Alternatively or in addition, virtual computer system processing maybe constructed to implement one or more of the methods or functionality as described herein.

Although components and functions are described that may be implemented in particular embodiments with reference to particular standards and protocols, the components and functions are not limited to such standards and protocols. For example, standards for Internet and other packet switched network transmission (e.g., TCP/IP, UDP/IP, HTML, HTTP) represent examples of the state of the art. Such standards are periodically superseded by faster or more efficient equivalents having essentially the same functions. Accordingly, replacement standards and protocols having the same or similar functions as those disclosed herein are considered equivalents thereof.

The illustrations described herein are intended to provide a general understanding of the structure of various embodiments. The illustrations are not intended to serve as a complete description of all of the elements and features of apparatus, processors, and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be substantially minimized. Accordingly, the disclosure and the figures are to be regarded as illustrative rather than restrictive.

Although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, may be apparent to those of skill in the art upon reviewing the description.

The Abstract is provided with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments, which fall within the true spirit and scope of the description. Thus, to the maximum extent allowed by law, the scope is to be determined by the broadest permissible interpretation of the following claims and their equivalents, and shall not be restricted or limited by the foregoing detailed description.

We claim:

1. A method of contextualizing noisy samples comprising:
receiving a sample comprising exemplar content corresponding to one of a plurality of exemplars and noise, wherein the noise comprises a modification to the exemplar content relative to the exemplar content as originally comprised by a physical object from which the sample was generated, and wherein variance induced by the noise differentiates the sample from one or more of the plurality of exemplars;
generalizing the sample and the plurality of exemplars in order to minimize the variance induced by the noise;
comparing the generalized sample to each of the plurality of generalized exemplars to identify which of the plurality of exemplars corresponds to the exemplar content of the sample;
contextualizing the sample based on a document type corresponding to the identified exemplar of the plurality of exemplars; and
presenting the contextualized sample to a user to facilitate interpretation thereof and, in response thereto, receiving data representative of a user determination associated with the noise.

2. The method of claim 1 wherein the sample comprises an electronic document image.

3. The method of claim 2 wherein generalizing the sample and the plurality of exemplars further comprises applying a moving average filter to the sample and the plurality of exemplars in order to minimize the variance induced by the noise.

4. The method of claim 2 wherein the noise comprises handwritten information, scanner skew, image noise, or a combination thereof.

5. The method of claim 2 further comprising:
determining multiple exemplars of the plurality of exemplars which may correspond to the sample;
presenting the sample and the multiple exemplars of the plurality of exemplars to a user to facilitate determination thereof and, in response thereto, receiving data representative of a user determination identifying which of the multiple exemplars of the plurality of exemplars corresponds to the sample;
contextualizing the sample based on a document type corresponding to the identified exemplar; and
presenting the contextualized sample to a user to facilitate interpretation thereof and, in response thereto, receiving data representative of a user determination associated with the noise.

6. The method of claim 1 further comprising providing a confidence indication which indicates a level of confidence that the sample corresponds to the one of the plurality of exemplars, wherein the level of confidence is based on a size of the noise relative to the size of the sample.

7. The method of claim 1 wherein the sample comprises at least one of video or audio.

8. The method of claim 1 wherein at least one of the plurality of exemplars comprises a contextualized sample or sample characterized by a known document type.

9. A method of contextualizing noisy samples comprising:
receiving a sample electronic document image comprising exemplar information corresponding to one of a plurality of exemplar electronic document images and random information, wherein the random information comprises a modification to the exemplar information relative to the exemplar information as originally comprised by a physical object from which the sample electronic document image was generated, and wherein variance induced by the random information renders the sample electronic document image distinguishable from one or more of the plurality of exemplar electronic document images;
applying a filter to the sample electronic document image and the plurality of exemplar electronic document images in order to minimize the variance induced by the random information of the sample electronic document image;
identifying the one of the plurality of exemplar electronic document images corresponding to the exemplar information of the sample electronic document image by comparing the filtered sample electronic document image to each of the plurality of filtered exemplar electronic document images;
contextualizing the sample electronic document image based on a document type corresponding to the identified exemplar electronic document image; and
presenting the contextualized sample electronic document image to a user to facilitate interpretation thereof and, in response thereto, receiving data representative of a user determination associated with the random information.

10. A method of contextualizing noisy samples comprising:
receiving a sample electronic document image comprising exemplar content and noise, wherein the noise comprises a modification to the exemplar content relative to the exemplar content as originally comprised by a physical object from which the sample electronic document image was generated;
generating a plurality of transformations of the sample electronic document image, wherein each of the plurality of transformations of the sample electronic document image corresponds to a different level of filtering of the exemplar content and the noise;
comparing the plurality of transformations of the sample electronic document image to a plurality of transformations of each of a plurality of exemplar electronic document images;
determining one of the plurality of exemplar electronic document images of which a greatest number of the plurality of transformations satisfy a matching criteria with respect to the plurality of transformations of the sample electronic document image having a same level of filtering;
contextualizing the sample electronic document image based on a document type corresponding to the determined one of the plurality of exemplar electronic document images; and
presenting the contextualized sample electronic document image to a user to facilitate interpretation thereof and, in response thereto, receiving data representative of a user determination associated with the noise.

11. The method of claim 10 wherein comparing the plurality of transformations of the sample electronic document image to the plurality of transformations of each of the plurality of exemplar electronic document images further comprises:
(a) identifying a transformation of the plurality of transformations of the sample electronic document image having a highest level of filtering which has not been compared;
(b) identifying transformations for each of the plurality of exemplar electronic document images corresponding to the highest level of filtering identified in (a);

(c) comparing the transformations for each of the plurality of exemplar electronic document images identified in (b) to the transformation of the sample electronic document image identified in (a);

(d) eliminating any of the plurality of exemplar electronic document images from the comparing when the transformations identified in (b) for any of the plurality of exemplar electronic document images do not satisfy a matching criteria with respect to the transformation of the sample electronic document image identified in (a); and (e) repeating steps (a)-(d) until only one of the plurality of exemplar electronic document images remains.

12. The method of claim 10 wherein generating the plurality of transformations of the sample electronic document image, wherein each of the plurality of transformations of the sample electronic document image corresponds to the different level of filtering of the exemplar content and the noise further comprises generating the plurality of transformations of the sample electronic document image by recursively applying a moving average filter to the sample electronic document image.

13. The method of claim 10 wherein each of the plurality of transformations of the sample electronic document image comprises a different resolution.

14. The method of claim 10 wherein each of the plurality of transformations of the sample electronic document image comprises a different level of compression relative to the sample electronic document image.

15. A method of classifying an electronic document image, the method comprising:
receiving a sample electronic document image comprising content and noise, wherein the noise comprises a modification to the content relative to the content as originally comprised by a physical object from which the sample electronic document image was generated;
filtering the sample electronic document image to account for variance induced by the noise;
filtering a the plurality of exemplar electronic document images to a same level of filtering as the sample electronic document image;
determining one of the plurality of exemplar electronic document images corresponding to the content of the sample electronic document image by comparing the filtered sample electronic document image to each of the plurality of filtered exemplar electronic document images;
contextualizing the sample electronic document based on a document type corresponding to the determined one of the plurality of exemplar electronic document images; and
presenting the contextualized sample electronic document image to a user to facilitate interpretation thereof and, in response thereto, receiving data representative of a user determination associated with the noise.

16. A method of classifying an electronic document image, the method comprising:
identifying a plurality of exemplar electronic document images wherein each of the plurality of exemplar electronic document images is characterized by a document type;
receiving a sample electronic document image comprising a variation of one of the plurality of exemplar electronic document images, wherein the variation comprises a modification to content as originally comprised by a physical object from which the sample electronic document image was generated, and wherein variance induced by the variation distinguishes the sample electronic document image from one or more of the plurality of exemplar electronic document images;
filtering the sample electronic document image and the plurality of exemplar electronic document images in order to minimize the variance induced by the variation;
comparing the filtered sample electronic document image to each of the plurality of filtered exemplar electronic document images to determine one of the plurality of exemplar electronic document images corresponding to the sample electronic document image;
contextualizing the sample electronic document based on the document type corresponding to the determined one of the plurality of exemplar electronic document images; and
presenting the contextualized sample electronic document image to a user to facilitate interpretation thereof and, in response thereto, receiving data representative of a user determination associated with the variation.

17. A system for contextualizing noisy samples comprising:
a memory operative to store a plurality of exemplars;
an interface coupled with the memory and operative to receive a sample comprising exemplar content corresponding to one of the plurality of exemplars and noise, wherein the noise comprises a modification to the exemplar content relative to the exemplar content as originally comprised by a physical object from which the sample was generated; and
a processor coupled with the interface and operative to receive, via the interface, the sample comprising the exemplar content corresponding to one of the plurality of exemplars and the noise, wherein variance induced by the noise differentiates the sample from one or more of the plurality of exemplars, generalize the sample and the plurality of exemplars to minimize the variance induced by the noise, compare the generalized sample to each of the plurality of generalized exemplars to identify which of the plurality of exemplars corresponds to the exemplar content of the sample, contextualize the sample based on a document type corresponding to the identified exemplar, and present the contextualized sample to a user to facilitate interpretation thereof, and in response thereto, receive data representative of a user determination associated with the noise.

18. The system of claim 17 wherein the sample comprises an electronic document image.

19. The system of claim 18 wherein the processor is further operative to apply a filter to the sample and the plurality of exemplars in order to minimize the variance induced by the noise.

20. The method of claim 19 wherein the filter applied by the processor comprises a moving average filter.

21. The system of claim 17 wherein the noise comprises handwritten information, scanner skew, image noise, or a combination thereof.

22. The system of claim 17 wherein the processor is further operative to determine multiple exemplars of the plurality of exemplars which may correspond to the exemplar content of the sample, present the sample and the multiple exemplars of the plurality of exemplars to a user to facilitate determination thereof and, in response thereto, receive data representative of a user determination of which of the multiple of the plurality of exemplars corresponds to the exemplar content of the sample, contextualize the sample based on a document type of the identified exemplar, and present the contextualized sample to a user to facilitate interpretation thereof and, in response thereto, receive data representative of a user determination associated with the noise.

23. The system of claim 17 wherein the processor is further operative to provide a confidence indication which indicates a level of confidence that the sample corresponds to the one of the plurality of exemplars, wherein the level of confidence is based on a size of the noise relative to the size of the sample.

24. The system of claim 17 wherein the sample comprises at least one of video or audio.

25. The method of claim 1 wherein the noise comprises handwritten information.

26. The system of claim 17 wherein the noise comprises handwritten information.

\* \* \* \* \*